June 8, 1965     A. WALLER     3,188,028
ADJUSTABLE HANGING BRACKET
Filed March 20, 1962
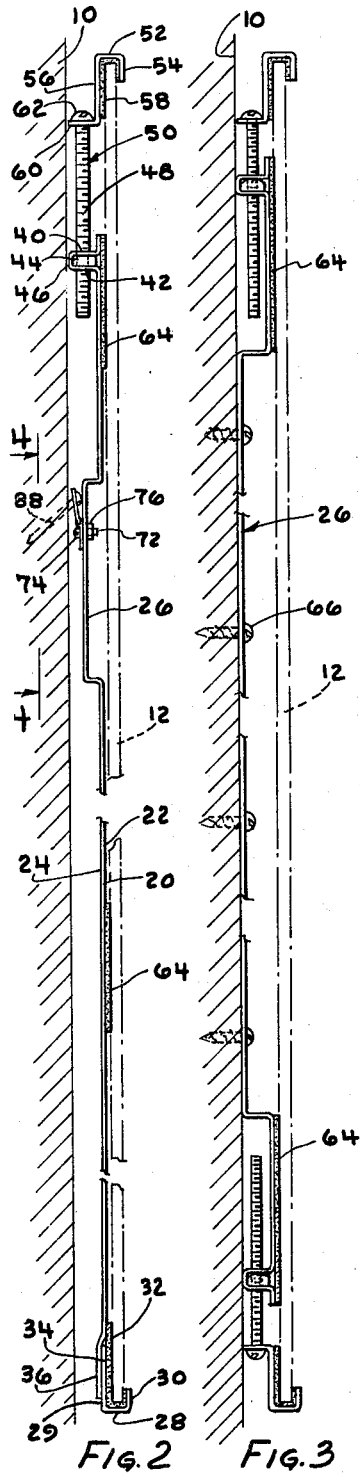
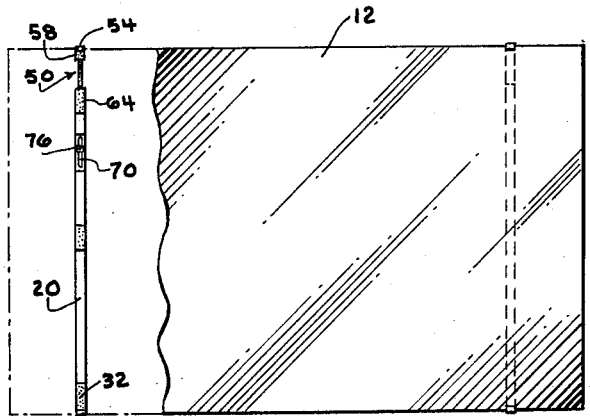
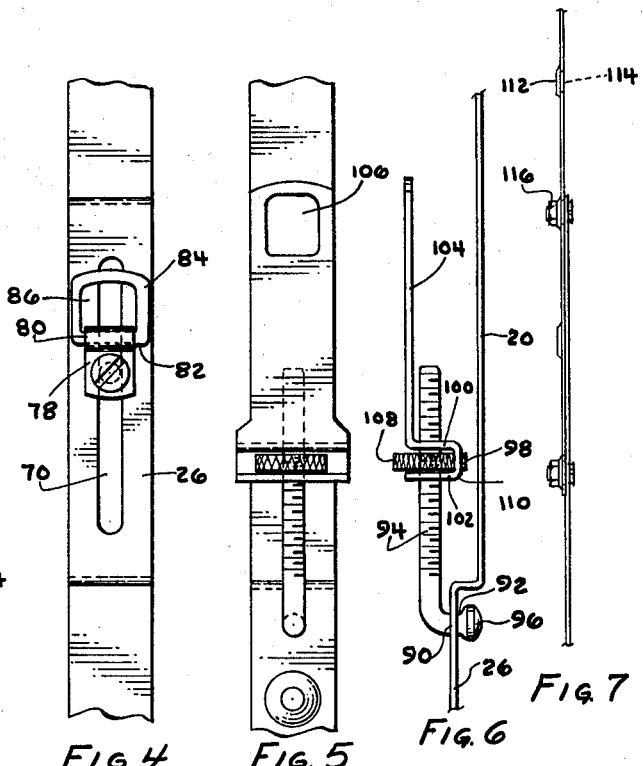
INVENTOR.
ARTHUR WALLER

3,188,028
ADJUSTABLE HANGING BRACKET
Arthur Waller, Highland Park, Ill., assignor to Bull Dog Lock Company, Chicago, Ill., a corporation of Illinois
Filed Mar. 20, 1962, Ser. No. 180,987
2 Claims. (Cl. 248—31)

This invention relates to a hanging bracket, and more particularly to an adjustable bracket for hanging a mirror or the like panel member upon a vertically disposed wall.

Very often in the hanging of a mirror, picture, painting, plaque, or the like, it is desirable to provide for adjustability in the vertical location of the mirror etc. upon the wall without the necessity for re-location of the hanger bracket on the wall, since such re-location would require additional holes to be punctured into the wall thereby to mar the wall surface. Adjustability of the bracket enables the mirror or the like structure to be more easily mounted on the wall, since it then becomes unnecessary exactly to locate the position for attachment of the bracket and thereby also to enable the mirror or the like to be mounted without skilled labor or highly experienced labor.

It is an object of this invention to produce a mounting bracket for use in support of a mirror, picture, painting, plaque, or the like panel member on a vertically disposed wall, and it is a related object to produce a mounting bracket of the type described which is adjustable while in position of use on the wall to vary the vertical location of the supported panel; which is adjustable to enable a firm gripping relationship to be established with the edges of the panel for support; which enables the panel to be supported without a backing member; which enables a mirror to be mounted in fixed position on the wall without marring the silvered back side of the glass panel, and which is easy to install and adjust by unskilled or inexperienced labor.

These and other objects and advantages of this invention will hereinafter appear, and, for purposes of illustration, but not of limitation, embodiments of this invention are shown in the accompanying drawings, in which—

FIGURE 1 is a vertical front elevational view of a mirror mounted on a vertical wall by the use of a bracket embodying the features of this invention but with a part of the mirror broken away to illustrate the mounting bracket;

FIGURE 2 is a side elevational view of a mounting bracket embodying the features of this invention;

FIGURE 3 is a side elevational view of a modification in the mounting bracket;

FIGURE 4 is an elevational view of a hanger member used with the mounting bracket shown in FIG. 2;

FIGURE 5 is an elevational view of a modification in a hanger member which may be used with the bracket of FIG. 2;

FIGURE 6 is a side elevational view of the hanger member shown in FIG. 5, and

FIGURE 7 is a side elevational view of a portion of the bracket showing links attached for extending the length of the bracket.

Referring now to the drawings, the panel adapted to be mounted on a vertically disposed wall 10 is illustrated as a mirror 12 formed of a glass plate having a silvered backing. Ordinarily the silvered mirror is mounted on a Masonite or the like wooden panel backing to protect the silvered layer required for reflection from the mirror, and the backing panel is employed as the structural member by which the mirror plate is mounted upon the supporting wall. By the practice of this invention, the use of a separate panel backing for protection and for support of the mirror becomes unnecessary. While the invention will be described with reference to the support of a silvered mirror on the wall, it will be understood that the mounting brackets of this invention can be used to mount other panel members, such as pictures, paintings, plaques, or the like. With the bracket embodying the features of this invention, it is unnecessary to make use of a structurally strong backing panel, since the mirror can be directly mounted in position of use without such backing and without the need for protection of the silvered coating on the back side of the glass plate.

The simplest form of the mounting bracket is illustrated in FIG. 2 wherein the bracket is formed of an elongate metal strip 20 having a front face 22 and a back face 24, and an intermediate portion of the strip is formed with a rearwardly extending rectangularly shaped offset portion 26 of substantial dimension. The lower end portion of the strip can be bent to provide a forwardly extending ledge 28 with an upwardly extending lip 30 spaced forwardly from the front face of the strip by an amount corresponding to the thickness of the edge portion of the mirror adapted to be received therein plus the thickness of a felt lining 32 disposed against the front face of the strip and about the shelf and lip. Instead of forming the shelf and lip as an integral part of the metal strip, it is preferred to make use of a separate clip 29, as illustrated in FIG. 2, which is preformed to provide the lip 30, shelf 28, and connecting back wall 34 by which the clip is secured to a rearwardly offset portion 36 at the lower end of the strip 20.

At the opposite end, the strip 20 is provided with a rearwardly offset U-shaped section formed of horizontally disposed upper and lower parallel walls 40 and 42, respectively, spaced one from the other by an amount corresponding to the thickness of a nut member 44 adapted to be received therebetween and which are connected at their rearward edge by a back wall 46 spaced rearwardly from the front face of the strip by an amount greater than the crosswise dimension of the nut member 44 but less than the distance between the strip and the supporting wall 10, when the bracket is in mounted position of use. The upper and lower walls are provided in their central portions with aligned openings (not shown) for registry with the opening of the threaded nut member and dimensioned to enable the shank 48 of an elongate bolt 50 to extend therethrough into threaded engagement with the nut 44.

Another pre-formed clip, similar to the clip 28, and 30 is provided having horizontally disposed shelf 52 with a lip 54 extending downwardly from the forward edge and a plate 56 extending downwardly from the rearward edge, and a felt padding 58 lining the inner surfaces thereof with the space between the lined lip 54 and plate 56 being dimensioned to correspond to the thickness of the mirror edge adapted to be received therebetween.

The upper clip is formed with a lower edge portion turned rearwardly substantially perpendicularly to provide a flange 60 having an opening through the central portion thereof dimensioned to enable the shank of the bolt 50 to extend therethrough but with the head 62 of the bolt having a greater crosswise dimension than the opening whereby it is supported on the top surface of the flange.

In addition to the padding 32 and 58 lining the clip members, additional pieces of felt 64 or the like padding material may be applied to line vertically spaced-apart portions along the front face of the strip 20 to bear against the silvered back side of the mirror when the mirror is secured in mounted relationship on the bracket.

In practice, the bolt 50 is threaded through the opening in the flange 60 and through the openings in the U-shaped member 40, 42, and 46 and turned into threaded engagement with the bolt 44 inserted into the U-shaped offset in a manner to prevent turning movement. When the strips are rigidly secured to the wall, as in FIG. 3, two or more of the assembled strips are mounted on the wall 10 in laterally spaced-apart relation and approximately at the height required properly to mount the mirror on the wall but with the bolts 50 turned to provide for vertically spaced relation between the clip shelves which is greater than the height of the mirror. Thereafter, the lower edge of the mirror is slipped into the groove defined by the lip 30 and backing plate 29 of the lower clips whereby the lower edge of the mirror comes to rest on the shelf 28 and is retained therein by the confronting lips 30.

The mirror is then rocked rearwardly about the shelf as a pivot until the back side of the mirror is flush against the felt-lined front face of the strip of the mounting bracket with the upper edge passing beneath the lips 54 of the upper clips and into vertical alignment with the groove defined between the lips 54 and the backing plate 58. Thereafter, a screw driver can be inserted from the top into the space between the clip and the wall for engagement with the slot 64 in the head of the bolt to turn the bolt in the direction to effect downward displacement of the clip until the upper edge of the mirror is firmly engaged by the shelf and thus confined between the lip 54 and the plate 56.

Thus the mirror is firmly engaged at its upper and lower edges and at laterally spaced-apart portions stably to mount the mirror on the bracket which, in turn, is firmly mounted on the wall. It will be understood that the bracket described is reversible to provide the stationary clip portion at the top and the adjustable clip portion at the bottom, whereby the displacement of the clip members in the direction toward each other firmly to grip the edges of the mirror can be effected by turning movement of the bolt 50 in the direction to displace the movable clip in the upward direction toward the opposite cooperating clip member.

When the bracket has been accurately positioned on the wall, the bracket embodying features of this invention can be rigidly secured to the wall as by means of screws 66 or other fastening means extending through vertically spaced-apart openings of the portion 26 which is offset rearwardly, as shown in FIG. 2, by an amount which is as great as the U-shaped offset in the strips but greater than the thickness of the heads of the screws 66, so that such metal-fastening members will not project beyond the front face of the mounted strip or otherwise come into damaging engagement with the silvered back side of the mirror.

When adjustability is desired thereby to require less accurate location of the bracket on the wall, this adjustability can be embodied in the bracket of this invention in a number of ways. In one system, illustrated in FIGS. 2 and 4, the rearwardly offset portion 26 is formed with an elongate, vertically disposed slot 70 through which a short bolt member 72 is adapted to extend with the head 74 of the bolt on one side and with a nut member 76 on the other side to tighten the bolt in a manner to fix the bolt in a vertically adjustable position within the slot. Fixed to the head 74 is a metal body 78 having an eyelet portion 80 at the other end in which the bail 82 of an eyelet 84 or ring is pivotally received. The ring is dimensioned to have an opening 86 which enables the head of a mounting member in the form of a nail 88 or screw to extend therethrough after the nail or screw has been driven into the wall 10. Thus by vertical adjustment of the hanger with reference to the slotted portion 26, the vertical position of the bracket can be adjusted on the wall.

Another way in which the vertical location of the bracket is adjusted on the wall is illustrated in FIGS. 5 and 6, wherein the rearwardly offset portion 26 of the strip 20 is provided with an opening 90 through which the shank 92 of a bolt 94 extends with the head 96 of the bolt on the inner side pivotally to mount the bolt on the bracket. The shank portion, through its major length is turned to extend substantially perpendicularly from the head portion and the shank portion extending through the opening, thereby to extend upwardly into threaded engagement with a nut member 98 which is located between spaced upper and lower horizonally disposed walls 100 and 102 respectively formed on the lower end portion of a hanger plate 104 having a nail or screw head opening 106 at the opposite end. The nut member 98 is capable of turning movement and, for this purpose, it is preferred to make use of a nut member in the form of a cylindrical disc having a knurled peripheral surface 108 to assist in establishing a gripping relation for turning movement. The vertically disposed bail portion 110 interconnecting the parallel spaced walls 100 and 102 is provided with an opening in the center to enable the nut member 98 to extend therethrough and the walls 100 and 102 are provided with central openings for the passage of the threaded shank 94 of the bolt member therethrough into threaded engagement with the nut. Thus the vertical position of the bracket can be adjusted before or even after mounting the bracket on the wall by turning the nut 98 in one direction or the other.

By way of still further modification, either in combination with a fixed support, as in FIG. 3, or a vertically adjustable support, as in FIGS. 4 and 5, means for vertical adjustment and mounting of the mirror on the bracket can be achieved in accordance with the construction illustrated in FIG. 3, wherein the construction previously described at the top of the bracket in FIG. 2 is repeated at the bottom end portion to provide upper and lower clips, both of which are shiftable in the direction toward and away from each other in response to turning movement of the bolt members 50. Thus, after the mirror has been mounted on the bracket, which has already been mounted on the wall 10, the vertical position of the mirror can be adjusted by turning the bolts. For adjustment in the upper direction, it is desirable first to turn the bolt 50 at the top to enable upward displacement of the corresponding clip and then by turning the bolt 50 at the bottom by a corresponding amount to raise the bottom clip and re-establish the firm engagement with the mirror edges. Similarly, the mirror can be adjusted downwardly by turning the bolt of the bottom clip to lower the latter, while tightening the bolt at the top by a corresponding amonut to lower the upper clip. When the adjusted position has been obtained, the bolts can be tightened firmly to grip the opposite edges of the mirror between the clip members.

In the modification wherein the bracket is fixed to the wall by vertically spaced screws 66 or the like fastening means, as illustrated in FIG. 3, the offset portion 26 should be at least as deep as the offset of the U-shaped nut-receiving members for holding the nut members against turning movement; and it is preferred to make the offset the same depth for more substantial support by the wall.

When the strips or brackets are attached to the wall other than by the fixed means illustrated in FIG. 2, the hanger strips can be hung on the wall prior to mirror mounting but it is preferred to pre-assemble the hanging strip and mirror to provide a pre-assembled unit which can thereafter be hung from suitable hooks or the like on the wall.

Means can be provided to increase or decrease the length of the bracket to enable greater flexibility in the use of the bracket with mirrors of different lengths. For this purpose, the strip 20 can be formed with the clip ends on separate segments which are adapted to be interconnected one with the other or with one or more extension links in between, as illustrated in FIG. 7. For this purpose, the end portions of the segments and links are provided with uniformly spaced-apart dimples 112 extending in one direction with openings 114 through the base thereof. Thus the dimples on the end of one segment or link are adapted to interfit with the dimples on the adjacent end portion of the other segment or link to provide for a stabilized connection when the interconnected end portions of the segments or links overlap by an amount to provide for interfitting of at least two dimpled portions. The overlapping segments and links can be secured together by bolt and nut means 116, as illustrated in FIG. 7, to effect the desired interconnection.

It will be apparent from the foregoing that I have provided a simple mounting bracket which can be easily mounted in the desired relationship upon a vertically disposed wall, and which can be adjusted in a simple and efficient manner firmly to grip a mirror or the like panel structure in mounted relationship upon the wall and to permit vertical adjustment of the mounted mirror or panel for proper placement upon the wall. It will be evident further that the described mounting bracket is capable of use with mirrors or panels in which the usual structural supporting members and backing plates are eliminated without the danger of causing marring or other disfiguring of the silvered surface or other elements of the mounted panels and the like.

It will be understood that modifications may be made in the construction and operation of a hanger bracket embodying the features of this invention without departing from the spirit of the invention, especially as defined in the following claims.

I claim:

1. A wall hanging bracket comprising an elongate strip, a rearwardly offset portion intermediate the ends of said strip, means in said rearwardly offset portion for attachment to the wall, clip members on the opposite ends of said strip having a forwardly extending horizontally disposed portion and an end portion extending vertically from the forward end of said horizontally disposed portion and in the direction away from the end of the strip and in spaced relationship thereto, each of said clip members being adjustably secured to the end of the strip for endwise movement in the direction toward and away from the end of the strip to increase and decrease respectively the spaced relationship between the clip members on the ends of the strip, and including a flanged portion extending rearwardly from said clips having a central opening dimensioned to enable the shank of a threaded bolt to extend therethrough, a rearwardly offset U-shaped portion on the corresponding end of the strip having interconnected upper and lower horizontally disposed walls spaced one from the other by an amount corresponding to the thickness of a nut member, a nut member disposed between said spaced upper and lower horizontally disposed walls, openings in the upper and lower walls aligned one with another and the threaded opening of the nut member and dimensioned to enable a threaded bolt to extend therethrough into threaded engagement with the nut member, and a threaded bolt having a head dimensioned to be larger than the opening in the flange and extending through the opening in the flange and the upper and lower walls into threaded engagement with the nut member whereby the clip member is displaced endwise in the direction toward and away from the end of the strip responsive to turning movement of the bolt.

2. A wall hanging bracket as claimed in claim 1 in which one end of the strip has an adjustable clip member while the other has a clip rigidly secured thereto to form a part thereof.

References Cited by the Examiner

UNITED STATES PATENTS

| | | | |
|---|---|---|---|
| 285,748 | 9/83 | Gulick | 248—59 |
| 486,804 | 11/92 | Wood | 248—327 X |
| 806,192 | 12/05 | Russell | 248—59 |
| 911,568 | 2/09 | Bickford | 88—96 |
| 1,867,276 | 11/30 | McIntyre | 248—226 |
| 2,195,979 | 4/40 | Ziolkowski | 211—105.2 |
| 2,697,572 | 12/54 | Pfankuch | 248—295 X |
| 2,905,412 | 9/59 | Kipp | 248—30 |
| 2,983,473 | 5/61 | Waller et al. | 248—31 |

FOREIGN PATENTS

| | | |
|---|---|---|
| 299,983 | 9/54 | Switzerland. |
| 412,852 | 7/34 | Great Britain. |
| 577,343 | 5/46 | Great Britain. |
| 958,245 | 2/57 | Germany. |

CLAUDE A. LE ROY, *Primary Examiner.*